Aug. 21, 1945.          L. S. MARSHALL                2,383,006
              TESTING APPARATUS FOR LINK TRAINER RECORDERS
                    Filed Sept. 3, 1943        2 Sheets-Sheet 1
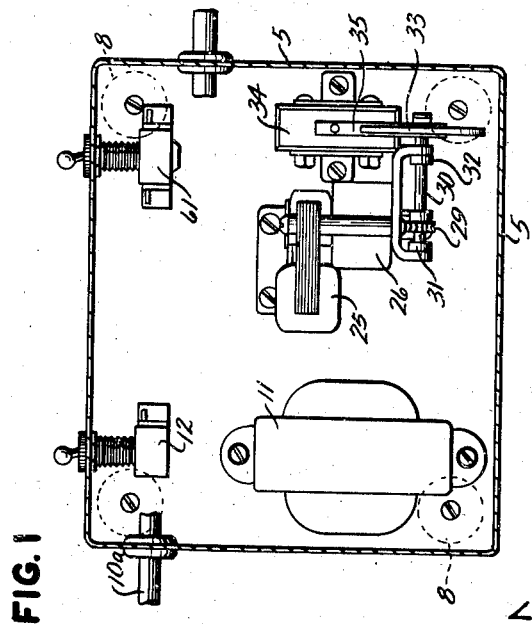
INVENTOR
LELAND S. MARSHALL
BY
                    ATTORNEYS Aug. 21, 1945.  L. S. MARSHALL  2,383,006
TESTING APPARATUS FOR LINK TRAINER RECORDERS
Filed Sept. 3, 1943  2 Sheets-Sheet 2
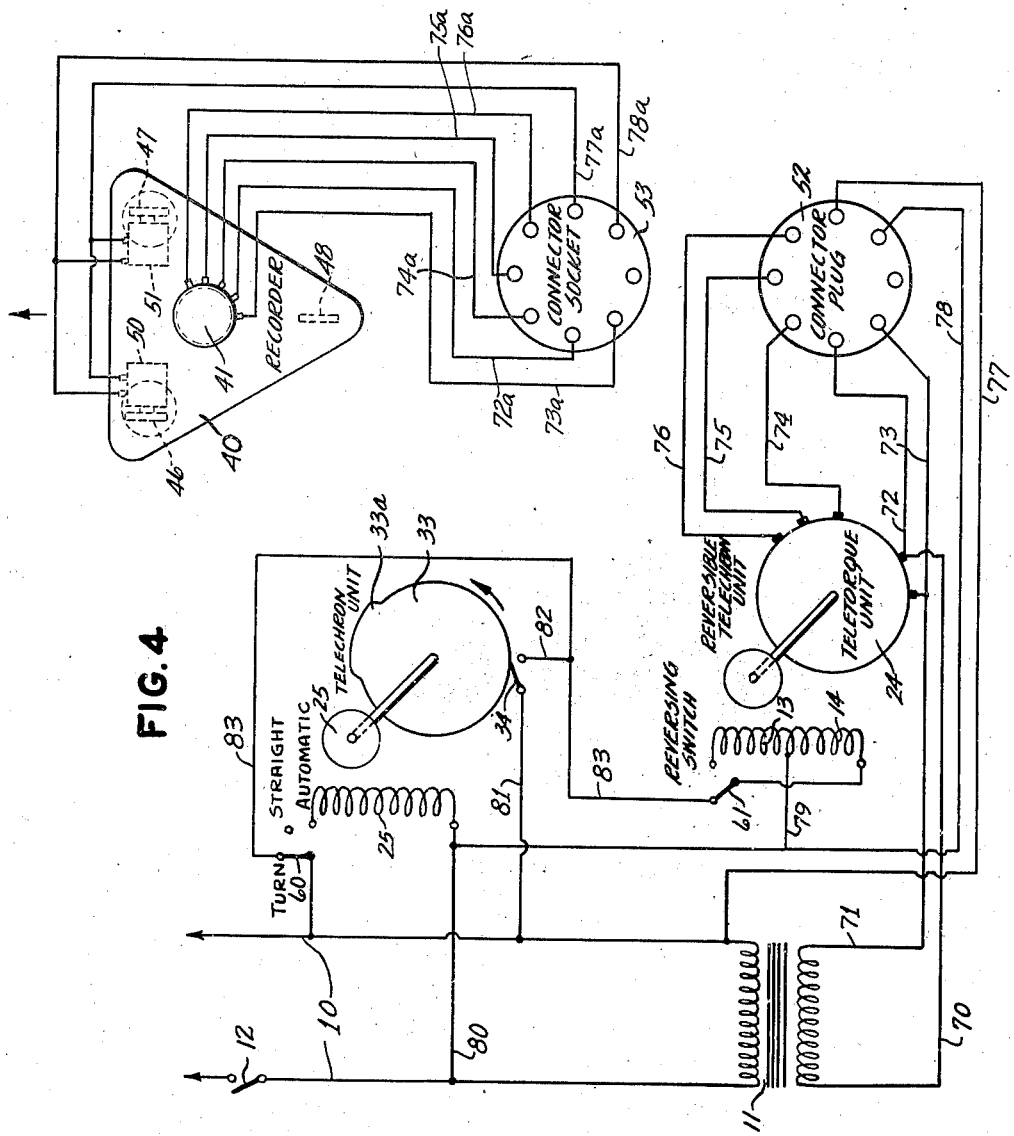
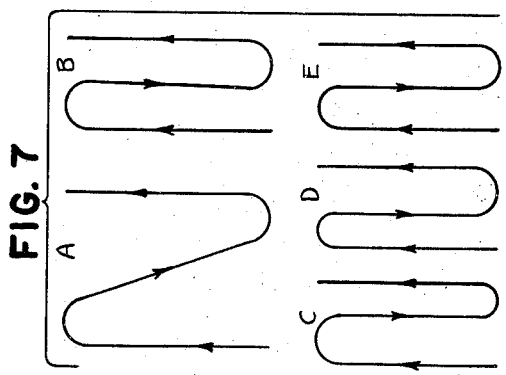
INVENTOR
LELAND S. MARSHALL
BY
ATTORNEYS Patented Aug. 21, 1945

2,383,006

UNITED STATES PATENT OFFICE 2,383,006

TESTING APPARATUS FOR LINK TRAINER RECORDERS

Leland S. Marshall, Dayton, Ohio

Application September 3, 1943, Serial No. 501,127

4 Claims. (Cl. 73—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for testing the accuracy of the flight log or recorder which makes a graphic record of the course "flown" by a student in a Link trainer. Reference may be made to British Patent No. 484,243 to E. A. Link, Jr., or Link Patent No. 2,179,663, dated November 14, 1939.

The Link trainer is an aviation training device wherein a fuselage, having a cockpit for the student, is provided with controls similar in appearance and action to those of an airplane, and also has aircraft instruments and radio apparatus, making it possible to simulate nearly every condition or operation which may arise during a flight. The student "flies" the trainer under a hood, on instruments, following instructions from an instructor, who sits at a desk in the same room in which the trainer is set up. On the desk top is the flight log or recorder, which travels very slowly (0.875 or ⅞ in. per min.) marking on paper or plastic sheets an ink line which reproduces on a miniature scale the path the student would have flown had he actually been aloft in an airplane and had manipulated the airplane controls in the same manner in which the trainer was controlled. Thus any errors which the student makes in attempting to follow an assigned problem are faithfully recorded and may be the subject of discussion between the instructor and the student after the "flight" is ended. Obviously any maladjustment or malfunctioning of the recorder will result in an erroneous record which may mislead the instructor and impede instruction of the student. To check the accuracy of the recorder, I have devised the novel tester which will be described below. Other objects are to provide a tester which is portable, which is reliable, of simple construction, inexpensive to operate, and capable of being operated semi-automatically or under manual control by personnel without a high degree of skill. Further objects will be apparent from the following description of the preferred embodiment of the invention in the accompanying drawings, wherein, Fig. 1 is a horizontal section of the tester;

Fig. 2 is a side elevation, with the cover on, and part of the wall being broken away to expose the interior;

Fig. 3 is a fragmentary sectional elevation;

Fig. 4 is a wiring diagram;

Fig. 5 is a side elevation of the recorder;

Fig. 6 is a plan view of the gears employed for turning the recorder; and

Fig. 7 is a group of five diagrams illustrating the five kinds of tracks or graphs made by the recorder when in and out of adjustment.

Referring particularly to the drawings, the preferred form of tester comprises a casing 5 which is a square box made of any rigid material with a removable top cover 6 and cover handle 7. This casing encloses all the other parts of the tester and provides, in effect, a frame to which these other parts are attached so as to maintain their proper positions. Pads or feet 8 of soft material are secured to the bottom of the box so that it may sit level on the instructor's desk without scratching any polished or plastic surface. To deliver electrical energy to the tester, a pair of leads 10 in an insulating cable 10a may be connected to a source of 110 v. current, and to a step-down transformer 11 by which the current is converted to 32 volts. A main switch 12 is interposed between the transformer and one of the power leads so that current may energize the tester or may be shut off by a flick of the finger.

Coupled with the 32 v. side of the transformer is a reversible "Telechron" unit, which comprises two irreversible "Telechron" motors 13, 14, each capable of driving a vertical shaft 15, but in opposite directions, through gear trains 16, 17, respectively, and a reduction gearing (not shown) in a housing 18. Shaft 15 and associated parts are carried on a bracket 19 screwed to a horizontal partition 20 which is attached to the walls of the casing 5. Secured to the lower end of shaft 15 is a gear 21 meshing with a gear 22 on the upper end of a shaft 23 which drives a "Teletorque" unit 24. This "Teletorque" unit controls the similar unit which is a part of the recorder, as will be described, thus operating the recorder from the testing apparatus of the invention when the recorder is being tested.

Another "Telechron" motor 25 drives a reduction gear train (not shown) in a box 26, and the shaft 27 from the driven side of the gear train has a worm 28 driving a worm gear 29 fixed to a horizontal shaft 30 supported in bearings 31, 32, and driving a vertical disk cam 33. Cam 33 is circular except for a raised portion 33a which with its sloping ends subtends an angle of about 72° or one-fifth of a revolution. The gear train 26, 27, 28, 29, drives the cam at ⅕ R. P. M., so that the raised portion 33a acts during exactly one minute of the five minutes required for a single rotation. A switch 34 of the type known as a "Micro Switch," made by the Micro Switch Corporation, Freeport, Illinois, has a spring cam follower 35 which is always in contact with the edge of the cam, the arrangement being such that when the cam follower moves over the circular portion of the cam, a circuit controlled by the switch 34 is open, but when the raised portion 33a of the cam encounters the follower, the switch 34 closes said circuit to effect certain movements of the recorder through the "Teletorque" unit, as will be described.

The recorder comprises a frame 40 carrying a "Teletorque" unit 41 driving a pinion 42 which meshes with three relatively large spur gears 43, 44, 45 (Fig. 6) of equal size, gears 43 and 44 turning two like driving wheels 46, 47, respectively, about vertical axes, and gear 45 turning an inking wheel 48 about its vertical axis. Thus the driving wheels effect steering of the recorder, and control its azimuth heading. An inking roller 49 is always in contact with the periphery of the inking wheel, and causes the latter to make an ink track or graph on any surface, such as a sheet of paper, over which the inking wheel rolls. The recorder is supported by the wheels 46, 47, 48, and travels because of the synchronous rotation of the two driving wheels, which is accomplished by two "Telechron" motors 50, 51, respectively, geared to said driving wheels. These motors are of the type that is used to drive electric clocks and hence have a uniform velocity if driven by 50 or 60 cycle current, but are irreversible. Both driving wheels 46, 47 and the inking wheel 48 are parallel at all times, so that the ink track records the entire travel of the recorder. When the Link trainer main switch is closed, the "Teletorque" motor (not shown) which is located in the trainer base and geared to the vertical main shaft of the trainer, is energized, and because "Teletorque" motors automatically line up with each other, through electrical connections known in the art, any turning movement of the trainer while under control of the student will cause rotation of the "Teletorque" unit in the base, which in turn effects equal angular movement of the "Teletorque" unit 41 on the recorder, and this angular movement is reflected in the ink graph traced as already explained. "Teletorque" unit 41 may be termed a motion-producing receiver. However, for testing purposes, the recorder is disconnected from the trainer and coupled to the tester, which is easily done by connecting socket 52 (Fig. 4) to plug 53, the recorder connecter plug.

Before explaining the operation of the tester, it may be helpful to describe the wiring diagram, Fig. 4, in more detail. As clearly shown, the power leads 10 and transformer 11 energize the rotor or primary leads 70, 71 of "Teletorque" unit 24. Leads 72, 73 couple the rotor of said "Teletorque" with connector plug 52. Phase leads 74, 75, 76 couple the field of the same "Teletorque" with connector plug 52. A conductor 77 connects another contact of plug 52 with one of the power leads 10, while a conductor 78, connected to a conductor 80, couples still another contact of plug 52 with the other power lead 10, so that the two contacts are energized by 110 v. current, or whatever current is supplied to the primary side of transformer 11. One side of the "Micro Switch" 34 is connected by a lead 81 with a power lead 10, while the other side is connected by a lead 82 with a conductor 83 which couples the reversing switch 61, and motors 13, 14, with the power source 10, the other side of the circuit of motors 13, 14 being shown as a conductor 79 connected to lead 78 and to conductor 80. It will be apparent that a switch 60 is connected to one of the power leads 10 and to conductor 83 which energizes the reversible "Telechron" unit and "Teletorque" 24 as well as the "Micro Switch." Switch 60 is an operator-controlled three point switch, and in the position shown will cause the recorder to turn continuously in a circular path. In another position, designated "Straight," the recorder will travel straight ahead, without turning at all, so long as its motors 50, 51 are energized through leads 77a, 78a (which make contact with leads 77, 78, respectively, through the plug and socket connection). In the third position of switch 60, the cam 33 is continuously driven to actuate "Micro Switch" 34 once during every revolution of the cam. The leads from the connector socket 53 which correspond to the leads to the plug 52 are designated the same except that they have the letter a added.

Assuming that the tester is coupled with the recorder, the operation is as follows: With the closing of three-way switch 60 to the automatic position, "Telechron" motor 25 is started, whereupon the cam 33 begins to rotate. Also, the "Telechron" motors on the recorder are simultaneously started, which causes the recorder to start traveling over the surface on which its driving wheels rest in the direction indicated by the arrow, Fig. 4. Travel will continue in a straight line, resulting in a straight ink line on the paper, until the "Teletorque" unit on the recorder is turned by the corresponding unit in the tester. With automatic control, this occurs at the end of four minutes of straight line travel (assuming that cam 33 has an angular velocity of ⅕ R. P. M. and that travel starts at one end of raised portion 33a and continues until the other end of the raised portion encounters the cam follower). As the cam follower is moved to close switch 34, the "Teletorque" unit in the tester is energized, causing slow turning of the "Teletorque" unit on the recorder. During one minute the recorder turns through exactly 180°, because of the gear ratios and speed of the "Teletorque" units. Then straight line movement is resumed, but along a path parallel to the original path. After four minutes, another turn of 180° is made, during one minute, but in the opposite direction, because reversing switch 61 has been closed manually to reverse the "Telechron" motor drive. If the parts are in proper order and adjustment, the path traced by the inking wheel will look like diagram E, Fig. 7. If preferred, the tester may cause a circular graph to be marked on the paper sheet; repeated tracing of the same circular path in either clockwise or counter-clockwise rotation indicating that the parts are in perfect order.

Diagram A shows the graph made if one of the drive wheels of the recorder needs to be sprung or shimmed toward the motor. Diagram B indicates that the same drive wheel should be sprung or shimmed very slightly away from one motor. Other testing instruments are used if it is desired to identify the particular drive wheel which is out of adjustment. Diagram C shows that both drive wheels should be sprung or shimmed slightly away from the motors, and diagram D indicates that both drive wheels should be sprung or shimmed slightly toward the motors. If the inking wheel is out of adjustment, the described tester will cause a faulty graph to be marked, but it will not be possible to locate the source of the trouble unless a different procedure is followed, not necessary to outline here.

The described apparatus greatly facilitates the testing of a recorder of a Link trainer, since the testing takes place independently of the trainer. Thus operating economies are realized. A single tester may test many recorders at a station or air field and since it weighs only a few pounds, it may easily be carried to another location for another series of tests. Furthermore, the operation of newly manufactured recorders may be accurately checked, without any high degree of skill, by users of my invention.

What I claim is:

1. Testing apparatus for testing aviation ground trainer recorders, the recorders each comprising a frame, motor-operated drive wheels supporting the frame for very slow travel over a surface, recording means, and steering means for controlling the azimuth heading of the recorder, said steering means having an electrical motion-reproducing receiver operatively connected thereto to actuate the same, in combination, an electrical motion-transmitting member electrically connected to said receiver, a source of electricity, leads connecting the motion-transmitting member with the source of electricity, other leads connecting the motors of the drive wheels with the source of electricity, an automatically operated switch coupled to the source of electricity for putting the motion-transmitting member in and out of the circuit at predetermined times, electric motor means for driving the motion-transmitting member in opposite directions when in the circuit, and a reversing switch coupled to the electric motor means for controlling the direction of movement of the motion-transmitting member, hence the direction of travel of the recorder.

2. The invention according to claim 1, wherein there is a manually controlled three way switch, and leads connecting the three-way switch to the source of electricity, to the reversing switch and to the means for driving the motion-transmitting member in opposite directions, so that the recorder when coupled to the testing apparatus may travel straight, or may turn continuously, or may travel in both straight and curved paths as controlled by said automatically operated switch.

3. Testing apparatus for testing aviation ground trainer recorders, the recorders each comprising a frame, motor-operated drive wheels supporting the frame for very slow travel over a surface, recording means, and steering means for controlling the azimuth heading of the recorder, said steering means having an electrical motion-reproducing receiver operatively connected thereto to actuate the same, in combination, an electrical motion-transmitting member electrically connected to said receiver, a source of electricity, leads connecting the motion-transmitting member with the source of electricity, other leads connecting the motors of the drive wheels with the source of electricity, the drive wheels maintaining straight line travel except when turned by the receiver, a main switch to connect or disconnect the testing apparatus from the source of electricity, reversible motor means for driving the motion-transmitting member in opposite directions when in the circuit, a reversing switch for controlling the direction of drive of the motion-transmitting member, and a manually operated switch which in one position effects straight line travel and in another position effects continuous arcuate or circular travel of the recorder.

4. Testing apparatus for testing aviation ground trainer recorders, the recorders each comprising a frame, motor-operated drive wheels supporting the frame for very slow travel over a surface, recording means, and steering means for controlling the azimuth heading of the recorder, said steering means having an electrical motion-reproducing receiver operatively connected thereto to actuate the same, in combination, an electrical motion-transmitting member electrically connected to said receiver, a source of electricity, leads connecting the motion-transmitting member with the source of electricity, other leads connecting the motors of the drive wheels with the source of electricity, the drive wheels maintaining straight line travel except when turned by the receiver, a main switch to connect or disconnect the testing apparatus from the source of electricity, time-controlled mechanism for driving the motion-transmitting member in either clockwise or counter-clockwise direction, and operator-controlled mechanism for changing the direction of drive of the motion-transmitting member, hence the direction of travel of the recorder.

LELAND S. MARSHALL.